United States Patent [19]

Hirai et al.

[11] Patent Number: 5,118,780
[45] Date of Patent: Jun. 2, 1992

[54] POLYESTER URETHANE FIBER: POLYESTER MADE FROM METHYL PENTANE DIOL

[75] Inventors: Koji Hirai; Setuo Yamashita; Yukiatsu Komiya; Katsura Maeda, all of Kurashiki, Japan

[73] Assignee: Kuraray Co., Ltd., Kurashiki, Japan

[21] Appl. No.: 512,146

[22] Filed: Apr. 20, 1990

[30] Foreign Application Priority Data

May 12, 1989 [JP] Japan ................................. 1-119470
Oct. 26, 1989 [JP] Japan ................................. 1-280871

[51] Int. Cl.$^5$ ............................................. C08G 18/42
[52] U.S. Cl. ..................................... 528/83; 524/265; 524/730; 524/731
[58] Field of Search ................... 528/83; 524/265, 730, 524/731

[56] References Cited

FOREIGN PATENT DOCUMENTS 194452   9/1986   European Pat. Off. .
   713  11/1972   Japan .
101496  12/1973   Japan .
173117   9/1985   Japan .
 97617   4/1988   Japan .
140655   2/1989   Japan .

OTHER PUBLICATIONS

Database WPIL, accession No. 87-089908 [13], Derwent Pub. Ltd., London, GB; & JP-A-62 039 613 Kuraray K.K.) Feb. 20, 1987.
Database WPIL, accession No. 86-071968 [11], Derwent Publications Ltd. London, GB; & JP-A-61 021 123 (Kuraray K.K.) *Whole abstract* Jan. 29, 1986.
Database WPIL, accession No. 87-068679 [10], Derwent Publications Ltd., London, GB; & JP-A-62 021 820 (Kuraray K.K.) Jan. 30, 2987 *Whole abstract*.
Patent Abstracts of Japan, vol. 10. No. 161 (C-352) [2217], Jun. 10, 1986; & JP-A-61 14 221 (Kuraray K.K.) Jan. 22, 1986 *Whole abstract*.
Database WPI, accession No. 70-67898R [38], Derwent Publications Ltd, London, GB; & JP-B-45 030 044 (Kurare K.K.) *Whole abstract* Jan. 1970.

Primary Examiner—Maurice J. Welsh
Assistant Examiner—Rachel Johnson
Attorney, Agent, or Firm—Oblon, Spivak, McClelland, Maier & Neustadt

[57] ABSTRACT

Provided is an elastic polyurethane fiber having excellent hot water resistance, elastic recovery at low temperatures and elongation, prepared from a polyurethane obtained by copolymerization of a high polymer diol obtained from 3-methyl-1,5-pentanediol and an aliphatic dicarboxylic acid, an organic diisocyanate and a chain extender.

10 Claims, No Drawings

POLYESTER URETHANE FIBER: POLYESTER MADE FROM METHYL PENTANE DIOL

BACKGROUND OF THE INVENTION

The present invention relates to an elastic polyurethane fiber.

Elastic polyurethane fibers are generally produced by wet spinning, dry spinning or melt spinning.

Polyurethane fibers produced from polyether diol have been known to be elastic fibers, but they are inferior in resistances to chlorine, light and heat.

Elastic fibers comprising polyurethanes produced from polyester diol are inferior in resistances to water and mildew.

Japanese Patent Application Laid-open No. 101496/1973 discloses a polyurethane utilizing 3-methyl-1,5-pentanediol and suggests that the polyurethane can be melt spun.

Japanese Patent Application Laid-open No. 173117/1985 describes elastic fibers made of polyurethanes utilizing polyester diols from hexamethylene glycol and 1,10-decanediol. However, the use of these long-chain, non-branched diols cannot give fibers with excellent elastic recovery, low temperature resistance and elongation.

Japanese Patent Application Laid-open No. 713/1972 discloses an elastic fiber made of a polyurethane utilizing a polyester diol comprising 2,4,4-trimethylhexanediol and adipic acid; U.S. Pat. No. 3,097,192 one prepared from a polyurethane derived from a polyester diol utilizing 2,5-hexanediol or 2,2-dimethyl-1,3-propanediol; and Japanese Patent Application Laid-open No. 97617/1988 one comprising a polyurethane utilizing (2,2-dimethyl-1,3-propane dodecane-dioate) glycol. However, these polyester diols, which are derived from diols having at least 2 methyl groups cannot give polyurethanes which form fibers with high heat resistance, elastic recovery and resistance to low temperatures.

In view of the foregoing, the present invention provides elastic polyurethane fibers being excellent in all of the properties of resistances to chlorine, water and mildew, elastic recovery, resistances to heat and hot water, and having high elongation.

While a polyurethane derived from high polymer diol utilizing as starting materials a long-chain diol and dicarboxylic acid can give fibers having improved resistances to hydrolysis and mildew and other properties, the fibers are significantly poor in elastic recovery, resistance to low temperatures and elongation. For example, elastic polyurethane fibers comprising a polyurethane utilizing polyester diol obtained by copolymerizing adipic acid, azelaic acid, sebacic acid, 1,10-decanedicarboxylic acid or the like with a linear diol, such as 1,4-butanediol, 1,6-hexane glycol, are extremely inferior in elastic recovery, resistance to low temperatures and elongation. Where propylene glycol or neopentyl glycol is used as the diol component to improve the above properties, the resultant elastic polyurethane fibers are poor in resistances to heat, hydrolysis and hot water. In the elastic fibers obtained from the polyurethane having the composition of the present invention, all of the above inconsistent problems are solved, and the fibers are excellent in resistances to hydrolysis, mildew, heat and low temperatures, as well as in elastic recovery and elongation, and further have high retention of the properties after they have been treated with hot water at 130° C. for 90 minutes.

SUMMARY OF THE INVENTION

The present invention provides an elastic polyurethane fiber prepared from a polyurethane obtained by copolymerizing a high polymer diol (A), an organic diisocyanate (B) and a chain extender (C), the high polymer diol (A) of the polyurethane being a polyester diol having a number average molecular weight of 1,000 to 3,500, comprising repeating units represented by the general formula

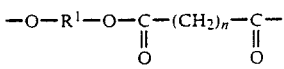

wherein $R^1$ represents a divalent organic group(s) at least 50% by mole of which is

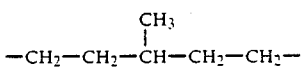

and n represents an integer of 4 to 10, and satisfying the following relationships (1) and (2)

$$6 \leq \frac{\text{(total number of carbon atoms/number of ester bonds)}}{} \leq 9 \quad (1)$$

$$0.03 \leq \frac{\text{(number of methyl groups/total number of carbon atoms)}}{} \leq 0.1 \quad (2)$$

wherein the total number of carbon atoms is the number of carbon atoms in the high polymer diol excluding those contained in the ester bonds; the molar ratio of (B)/(A) being 1.5 to 4.5; said fiber satisfying the conditions (I), (II) and (III) given below.

Hot water resistance in terms of strength retention
$(\%) \geq 60$     (I)

Ratio of instantaneous elastic recoveries $\geq 0.8$     (II)

which is a ratio of instantaneous elastic recovery when elongated to 200% at $-10°$ C. to that at 20° C.

Elongation $(\%) \geq 350$     (III)

In other words, the present invention provides an elastic polyurethane fiber obtained by spinning, as later described herein, at a specific spinning speed, spinning draft, spinning tension and feed-speed difference, and heat treating at a specific temperature range:

a polyurethane utilizing as starting material high polymer diol a polyester diol derived from 3-methyl-1,5-pentanediol and satisfying the above-mentioned conditions (1) and (2).

DETAILED DESCRIPTION OF THE PREFERRED EMBODIMENTS

The elastic polyurethane fiber of the present invention is characterized by the high polymer diol residue, that is, the soft segment, contained in its material polyurethane.

In the present invention, the high polymer diol (A) used is a polyester diol having a number average molecular weight of 1,000 to 3,500, comprising repeating units represented by the general formula

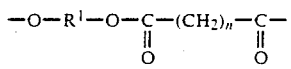

wherein $R^1$ represents a divalent organic group(s) at least 50% by mole of which is

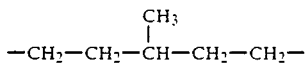

and n represents an integer of 4 to 10, and satisfying the following relationships (1) and (2).

$$6 \leq \text{(total number of carbon atoms/number of ester bonds)} \leq 9 \quad (1)$$

$$0.03 \leq \text{(number of methyne groups/total number of carbon atoms)} \leq 0.1 \quad (2)$$

wherein the total number of carbon atoms is the number of carbon atoms in the high polymer diol excluding those contained in the ester bonds.

The polyester diol is obtained by using as the diol component a diol(s) including 3-methyl-1,5-pentanediol in an amount of at least 50% by mole of the total diols and as the dicarboxylic acid component an aliphatic dicarboxylic acid having 4 to 10, preferably 7 to 10 methylene groups such as adipic acid, pimelic acid, suberic acid, azelaic acid, sebacic acid and 1,10-decanedicarboxylic acid. The diol is combined with the dicarboxylic acid in such a ratio as will satisfy:

$$6 \leq \text{(total number of carbon atoms/number of ester bonds)} \leq 9$$

If the ratio is smaller than 6, the resultant fiber will be significantly low in resistances to hot water and low temperatures. On the other hand, if the ratio exceeds 9, the resultant fiber will have a poor elastic recovery and be poor in resistance to low temperatures and have low elongation. The ratio is more preferably:

$$6 \leq \text{(total number of carbon atoms/number of ester bonds)} \leq 8.5$$

It is further important in the present invention that the ratio of the number of methyne groups of the polyester diol used to the total number of carbon atoms be not less than 0.03 and not more than 0.1. With the ratio of less than 0.03 the elastic recovery, particularly that at low temperature, of the resulting fiber is low, while with the ratio of more than 0.1 the heat resistance, tensile strength and elasic recovery are low.

The methyne group used herein means

bonded to three different carbon atoms.

Examples of the dicarboxylic acid preferably used from the viewpoint of overall performance are azelaic acid, sebacic acid and 1,10-decanedicarboxylic acid, among which particularly preferred are azelaic acid and sebacic acid because of their good melt-spinnability. The dicarboxylic acid may contain small amounts of dicarboxylic acids having methylene groups in the chain in an amount outside the above specified range of 4 to 10.

If the content of 3-methyl-1,5-pentanediol in the diol components is less than 50% by mole, both the elastic recovery at low temperatures and elongation of the resultant fiber will decrease. Examples of diols used in combination with 3-methyl-1,5-pentanediol are, among others, 1,10-decanediol, 1,9-nonanediol, 1,8-octanediol, 1,6-hexanediol, 1,5-pentanediol and 1,4-butanediol, but other diol can also be used.

The molecular weight of the polyester diol has a large influence and is 1,000 to 3,500, more preferably 1,500 to 2,500. If the molecular weight is smaller than 1,000, the resultant fiber will have low heat resistance, low elastic recovery at low temperatures and low elongation. On the other hand, if the molecular weight is larger than 3,500, not only the resultant fiber will have low elastic recovery, but the spinnability will become poor with ready occurrence of spinneret soiling, filter clogging and the like, thereby shortening the continuous spinning operation time.

Examples of the diisocyanates suitably used in the present invention are aliphatic, alicyclic and aromatic diisocyanates such as 4,4-diphenylmethane diisocyanate, p-phenylene diisocyanate, 1,5-naphthylene diisocyanate and 4,4'-dicyclohexylmethane diisocyanate, among which particularly preferred is 4,4-diphenylmethane diisocyanate.

The chain extender used is a low-molecular-weight compound having at least 2 hydrogen atoms reactable with isocyanate, such as 1,4-butanediol, 1,4-bis(2-hydroxyethoxy)benzene, 1,6-hexanediol, hydrazine or propylenediamine, among which particularly preferred is 1,4-butanediol or 1,4 -bis(2-hydroxyethoxy)benzene.

In particular, where the elastic fiber is produced from a thermoplastic polyurethane by melt spinning, the proper selection of 4,4-diphenylmethane diisocyanate as the organic diisocyanate used for the synthesis of the thermoplastic polyurethane, in combination with 1,4-butanediol and/or 1,4-bis(2-hydroxyethoxy)benzene as the chain extender will give a fiber being excellent in heat resistance, elastic recovery and elongation.

For the purpose of further improving elastic recovery and elongation, it is recommended to use as the chain extender a combination of 1,4-butanediol (BD) and 1,4-bis(2-hydroxyethoxy)benzene (BHEB), in a BD/BHEB ratio (molar ratio) of 90/10 to 10/90, more preferably 20/80 to 80/20.

The elastic polyurethane fiber of the present invention is comprised of a polyurethane obtained by copolymerizing the high polymer diol, organic diisocyanate and chain extender described above.

It is necessary that the molar ratio of the organic diisocyanate (B) to the high polymer diol (A), [(B)/(A)], be 1.5 to 4.5, preferably 1.6 to 3.5 from the viewpoint of elastic recovery, hand, heat resistance and resistance to low temperatures.

The polyurethane constituting the elastic polyurethane fiber of the present invention is considered to be essentially composed of structural units of:

(a) divalent group derived from the high polymer diol molecule with its terminal hydroxyl groups being removed of 2 hydrogen atoms;

(b) a group derived from the organic diisocyanate, of the formula

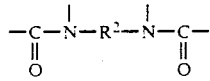

wherein $R^2$ represents a divalent organic group; and (c) a divalent group having a formula of a low-molecular-weight compound (chain extender) with its two hydrogen atoms reactable with isocyanate being removed.

It is preferred that the molar composition ratio of these residues. (b)/[(a)+(c)], be 0.9 to 1.2, more preferably 0.95 to 1.15 for the purpose of yielding an elastic polyurethane fiber having excellent heat resistance, elastic recovery and elongation.

The polyurethane having a molar composition ratio within the above-mentioned range of 1.02 to 1.15 can upon spinning give a fiber being excellent in heat resistance and elastic recovery and having high elongation. Such polyurethane is obtained either by polymerizing an excess-isocyanate system comprising a high polymer diol (A), an organic diisocyanate (B) and a chain extender (C) in molar composition ratio, (B)/[(A)+(C)], of 1.02 to 1.15, or by adding and blending an amount of a polyisocyanate or protected polyisocyanate compound to a melted conventional polyurethane prior to extrusion through spinneret.

The polyisocyanate compound herein means a compound having in the molecule thereof at least 2 isocyanate groups. Examples of the polyisocyanate include 4,4'-diphenylmethane diisocyanate, tolylene diisocyanate and naphthalene diisocyanate, which are commonly used in the production of polyurethanes, as well as isocyanate-terminated prepolymers synthesized by reacting a polyol having a molecular weight of 300 to 3,000 with at least 2 molar equivalents of an organic diisocyanate having a molecular weight of not more than 500, dimers of organic diisocyanates, the foregoing modified with carbodiimides, and the like. The polyisocyanate compounds preferably contain in the molecule thereof 2 or 3 isocyanate groups, the former more particularly preferred.

The protected polyisocyanate herein means a compound obtained by reacting the isocyanate groups of the above-mentioned polyisocyanate compound with a protecter such as phenol, ε-caprolactam, oximes, ethyl acetoacetate, acetamide or the like, and includes all the compound capable of forming free isocyanate groups by thermolysis at high temperatures.

The polyisocyanate compound preferably has a molecular weight of 200 to 3,000. Too small an amount of the polyisocyanate compound added to a polyurethane cannot produce a sufficient effect, while too large an amount will sometimes lead to unstable spinning. The polyurethane to which the polyisocyanate compound is added during spinning is preferably one obtained by polymerization with a molar composition ratio, (B)/[(A)+(C)], of 0.95 to 1.08.

It is preferred that the polyurethane constituting the elastic polyurethane fiber of the present invention have an $\eta_{inh}$ of 0.2 to 1.6 dl/g, more preferably 0.3 to 1.4 dl/g, for the purpose of yielding an elastic polyurethane fiber having still higher elastic recovery property. The inherent viscosity, $\eta_{inh}$, is determined from the viscosity measured with Uberohde viscometer in a constant-temperature bath at 30° C., of a solution of specimen in N,N-dimethylformamide containing 1% by weight of N-butylamine, which has been kept standing for 24 hours after the dissolution, as follows:

$$\eta_{rel} = t/t_0$$

$$\eta_{inh} = \frac{\ln(\eta_{rel})}{C}$$

where
t = flowing out time of the solution (sec),
$t_0$ = flowing out time of the solvent (sec), and
C = concentration of specimen polymer (0.5 g/dl).

In the present invention, addition of an organic polysiloxane to the polyurethane being spun into fiber can provide the resultant fiber with high anti-sticking property. The amount of the organic polysiloxane to be added is preferably 0.05 to 3.0% by weight based on the weight of resulting elastic fiber. An addition exceeding 3.0% by weight will often cause problems in fiber formation and/or spinnability.

Where the elastic polyurethane fiber of the present invention is produced by melt spinning, the spinning is usually carried out in practice at a spinning temperature of not higher than 250° C., more preferably 200° to 235° C. The use of a polyurethane having a melt viscosity of at least 700 poises at the spinning temperature can give a fiber having still better elastic recovery.

The organic polysiloxane can be added to the polyurethane at any process before extrusion through spinneret, i.e. polymerization through extrusion of polyurethane. In particular, it is preferred to add the organic polysiloxane in the form of a blend with the aforedescribed polyisocyanate or protected polyisocyanate compound to be added before extrusion, which blend being added to melted elastic polyurethane. By blending with the polyisocyanate compound, the bulk of organic polysiloxane, which is small by itself, will become greater, thereby facilitating more uniform blending into the polyurethane. The addition of organic polysiloxane is preferably conducted at a place as close to the spinneret as possible, since, then, can be protected from thermal transformation or degradation.

Examples of the organic polysiloxane are dimethyl polysiloxane, diphenyl polysiloxane and the like, alcohol- or ether-modified compounds of the foregoing, among which particularly preferred are those modified with ethylene oxide or propylene oxide, more particularly ones modified by ethylene oxide with a large ratio of modification.

The elastic polyurethane used in the present invention may incorporate additives, e.g., a delustring agent such as titanium dioxide, ultraviolet absorber, antioxidant, color such as dye or pigment, and the like.

The process for producing the elastic polyurethane fiber of the present invention is now described.

The polyester diol used in the present invention can be produced by any known process. For example it can be produced by a known process for producing polyethylene terephthalate or polybutylene terephthalate, which comprises transesterification or direct esterification, followed by melt-polycondensation.

Known techniques for urethanization can be employed for producing polyurethane by copolymerizing high polymer diol, organic diisocyanate and chain extender. In particular, according to a study made by the present inventors, it has been found to be preferred to conduct melt polymerization in the substantial absence of inert solvent, and more particularly, to conduct continuous melt polymerization by the use of a multi-screw extruder.

The melt polymerization is preferably conducted at a temperature of 200° to 260° C., although this temperature range is not so critical. With the polymerization temperature of 260° C. or below the obtained thermoplastic polyurethane has higher heat resistance and mechanical properties, while with the temperature of 200° C. or above the melt spinnability is good.

The polyurethane thus obtained can be formed into fiber by known dry spinning, web spinning, melt spinning or the like processes. The melt spinning is particularly preferred because of its capability of forming fine filaments. The polyurethane is pelletized first, and the pellets are melt spun; or, the thermoplastic polyurethane obtained by melt polymerization is directly extruded through spinnerets, the latter process being preferred from the viewpoint of spinning stability.

The elastic polyurethane fiber of the present invention satisfying the afore-mentioned conditions (I), (II) and (III) can be produced by melt spinning under, for example, the following conditions.

The spinning speed is very important, and it is preferably not more than 900 m/min, more preferably not more than 600 m/min. The term "spinning speed" herein means the yarn speed at the godet roll.

The apparent draft, i.e. the area of a hole of spinneret/the cross-sectional area of a filament, is at least 50, preferably at least 100, more preferably at least 150.

The spinning tension, i.e. the tension of a spun yarn being taken up onto a bobbin with a winder, and is 0.1 g/denier, more preferably 0.05 g/d. The difference between the yarn speed at godet roll (i.e. spinning speed) and that at take-up is preferably not more than 5% (underfeed), and more preferably as close to 0 (same speed) as possible.

It is also preferred to heat treat the take-up yarn under a low humidity at a temperature of from 50° to 120° C., thereby sufficiently effecting the phase separation of hard and soft segments.

When a polyurethane with excess isocyanate is spun as described before, the spun fiber changes its fiber quality and thermal property with time. This can be explained as follows. In polyurethanes obtained by polymerization of excess-isocyanate system, or polyurethanes to which polyisocyanate compound is added during spinning, the reaction of the isocyanate has not been completed just after spinning and still proceeds after spinning, thereby forming urethane bonds, urea bonds and/or allophanate bonds by reaction of isocyanate with alcohol, water and/or urethane bond.

It is therefore preferred to conduct, after spinning, heat treatment at about 50° to 120° C. for 1 to 48 hours. With the progress of the above reaction, there are recognized effects of improving elastic recovery, heat resistance and increasing elongation. These effects are particularly notable when the afore-described polyester diol is used. This fact is considered, although not so clear, to be due to microphase separation proceeding in the thermoplastic polyurethane utilizing long-chain polyester diol.

Further the elastic polyurethane fiber of the present invention can be provided with still higher elastic recovery by, as described before, spinning the polyurethane with excess isocyanate, thereby making the amount of allophanate bonds in the fiber 0.005 to 0.05 mmol/g. The amount of allophanate bond is determined by dissolving a specimen fiber an 0.5N n-butylamine solution in N,N-dimethylformamide, followed by back-titration.

The elastic polyurethane fiber of the present invention has high resistance to hot water, and thus has a strength retention after hot water treatment of at least 60%, more specifically at least 70%. (Fibers having a strength retention after hot water treatment at 120° C. of at least 60% but having that at 135° C. of less than 60% are also included in the scope of the present invention.)

The elastic polyurethane fiber of the present invention has high elastic recovery at low temperatures, and thus has an instantaneous elastic recovery ratio of at least 0.8, more specifically at least 0.9. The elastic polyurethane fiber of the present invention has an elongation of at least 350%, more specifically at least 450% for practical purposes.

The elastic polyurethane fiber of the present invention is of the form of a substantially continuous filament or bundle of filaments, and it preferably has an evenness of fineness measured on 100-meter long sample of within the range of ±15%, more preferably within the range of ±10%.

The elastic polyurethane fiber thus obtained is used in the actual applications as it is, as core yarns covered with other fibers, or as fabrics in which it is used in combination with other fibers. Examples of other fibers are such known fibers as polyamide fiber, wool, cotton and polyester fiber, among which polyester fiber is particularly suited for the purpose of the present invention. Fibers from polyesters containing ethylene terephthalate residues in an amount of at least 90 mol % of total repeating units are still more preferred.

The elastic polyurethane fiber of the present invention can be dyed at a temperature of 120° C., and therefore can be used e.g. as elastic core yarn, union cloth, etc., in combination with polyester fibers, which are generally dyed at temperatures above 120° C. and have hence so far been not used together with polyurethane fibers.

The elastic covering yarn as used herein means yarns comprising an elastic polyurethane yarn as core covered with other fibers, and is prepared for example by using a twister, by air entanglement or by using a ring frame.

The elastic core yarn of the present invention is, when used as a core of core yarns, preferably contained in a ratio to the other fiber of 1:2 to 1:30.

The term "fabrics" used herein include woven, knitted and nonwoven fabrics, among which woven and knitted fabrics are preferred by virtue of their capability to give various mechanical properties by selecting weaving or knitting conditions.

In the fabrics prepared from the elastic polyurethane fiber of the present invention, the polyurethan fiber is placed preferably in the middle of the fabric thickness so that it will not appear on the surface. The fabrics are then desirable from the viewpoint of light fastness and aesthetic and comfortable characteristics in practical applications.

The elastic polyurethane fiber of the present invention is preferably contained in fabrics in an amount of at least 3% by weight for practical purposes. Where core yarns are used, they are preferably contained in fabrics in an amount of at least 5% by weight. With contents outside the above ranges, the elastic performance of the fabrics may sometimes be too low.

The elastic polyurethane fiber of the present invention is used in fabrics in combination with other fibers, the form of which is not limited and may be spun yarn or filament yarn, or grey yarn or textured yarn.

The other fibers used in combination with the elastic polyurethane fiber of the present invention may be of common fineness, and is preferably of 0.1 to 10 deniers.

The core yarn and fabrics utilizing the elastic polyurethane fiber of the present invention are used for example for the following items:

Clothing: swimming wear, cycling wear, leotards, lingerie, foundations, underwear, etc.

Clothing-miscellaneous: panty-stocking, socks, supporter, cap, gloves, power net, boundage, etc.

Non-clothing: gut for tennis racket, seaming thread for integrally molded car seat, metal-covered yarn for robot arm, etc.

Other features of the invention will become apparent in the course of the following descriptions of exemplary embodiments which are given for illustration of the invention and are not intended to be limiting thereof.

In the Examples various measurements were done according to the following methods.

Determination of Molecular Weight of High Polymer Diol

The hydroxyl value and acid value of specimen high polymer diol are measured, and the molecular weight is determined therefrom in the usual way.

Hot Water Resistance in Terms of Strength Retention

A specimen elastic polyurethane yarn is combined with a polyester yarn having a fineness of 2 to 5 times that of the polyurethane yarn, and the combined yarn is knitted into a tubular knitted fabric. The fabric is treated with hot water at 95° to 98° C. under relaxed condition for 10 minutes and air-dried. The thus treated fabric is pre-heatset (at 180° C. for 1 minute, hot circulating air, no tension) and treated with hot water under conditions of dyeing with disperse dye, that is, at a temperature of 120° to 130° C. under pressure for 60 minutes, and air-dried. The fabric is unknitted, and the elastic polyurethane yarn taken out is determined for tensile strength. The strength retention is the ratio in percentage of the thus determined strength to the strength of the specimen before knitting.

Determination of Tensile Strength and Elongation

JIS L-1013 is applied.

Instantaneous Elastic Recovery Ratio

The elastic recovery of a specimen elongated by 200% and kept at that state for 2 minutes at −10° C. and that at 20° C. are determined, and the ratio of the two is calculated. The instantaneous recovery herein means the ratio of recovery to original length of a specimen which has been elongated by 200%, kept at that state for 2 minutes and then released of the stress (JIS L-1096, modified):

$$\text{Instantaneous elastic recovery} = 100 \cdot [nl - (l^1 - l)]/nl$$

where:
n = ratio elongated,
l = original length,
(n+1)l = length when elongated, and
$l^1$ = length after removal of stress; the rate of extension and that of shrinkage by unloading are both 500 mm/min.

$$\text{Instantaneous recovery ratio} = \frac{\text{instantaneous recovery at } -10°\text{ C.}}{\text{instantaneous recovery at } 20°\text{ C.}}$$

The compounds used in Examples are shown by abbreviations shown in Table 1.

TABLE 1

| Abbr. | Compound |
| --- | --- |
| BD | 1,4-butanediol |
| PG | 1,2-propylene glycol |
| HD | 1,6-hexanediol |
| ND | 1,9-nonanediol |
| MPD | 3-methyl-1,5-pentanediol |
| AD | adipic acid |
| AZ | azelaic acid |
| SA | sebacic acid |
| DA | 1,10-decanedicarboxylic acid |
| TA | 1,11-undecanedicarboxylic acid |
| MDI | 4,4'-diphenylmethane diisocyanate |
| BHEB | 1,4-bis(2-hydroxyethoxy)benzene |
| PTG | polytetramethylene glycol |

REFERENCE EXAMPLE 1

Preparation of Polyester Diol

Esterification was effected with 1,534 g of 3-methyl-1,5-pentanediol and 1,880 g of azelaic acid in a molar ratio of MPD/AZ of 1.3/1 in nitrogen gas flow under atmospheric pressure and at about 195° C., while water formed by condensation was being distilled off. When the acid value of the resultant polyester decreased below about 1, the reaction was terminated by gradually increasing vacuum with a vacuum pump, to obtain a polyester diol having a hydroxyl group value of 56 and an acid value of 0.23 (hereinafter referred to as "Polyester a"). The polyester was liquid at room temperature and had a molecular weight of 2,000.

REFERENCE EXAMPLES 2 THROUGH 14

Reference Example 1 was repeated except for using acid components and diol components shown in Table 2 to obtain polyesters (Polyesters b through n) having a hydroxyl group value of 56 and acid values shown.

TABLE 2

| Reference | High polymer diol | Acid component (molar ratio) | Diol component (molar ratio) | X | Y | Number average polym. degree |
| --- | --- | --- | --- | --- | --- | --- |
| Example 1 | Polyester a | AZ | MPD | 6.84 | 0.081 | 2,500 |
| 2 | Polyester b | AZ | MPD | 7.09 | 0.084 | 1,500 |
| 3 | Polyester c | SA | MPD | 7.45 | 0.077 | 2,000 |
| 4 | Polyester d | DA/AD(8/2) | MPD | 8.04 | 0.075 | 1,500 |
| 5 | Polyester e | AZ | MPD/HD(7/3) | 6.93 | 0.058 | 2,000 |
| 6 | Polyester f | AZ/AD(7/3) | MPD/ND(7/3) | 7.00 | 0.057 | 2,000 |
| 7 | Polyester g | DA/AD(6/4) | MPD | 7.24 | 0.079 | 2,000 |
| 8 | Polyester h | AZ/DA/SA(6/1/3) | MPD/HD/BD(6/2/2) | 7.00 | 0.049 | 2,000 |
| 9 | Polyester i | AD | BD | 4.21 | 0 | 2,000 |
| 10 | Polyester j | AD | MPD | 5.36 | 0.105 | 2,000 |

TABLE 2-continued

| Reference | High polymer diol | Acid component (molar ratio) | Diol component (molar ratio) | X | Y | Number average polym. degree |
|---|---|---|---|---|---|---|
| 11 | Polyester k | AZ | HD | 9.93 | 0 | 2,000 |
| 12 | Polyester l | TA | MPD | 9.01 | 0.065 | 2,000 |
| 13 | Polyester m | DA | PG | 6.71 | 0.085 | 2,000 |
| 14 | Polyester n | AZ | MPD | 6.71 | 0.082 | 4,000 |

X = total number of carbon atoms/number of ester bonds
Y = number of methyne groups/total number of carbon atoms

EXAMPLES 1 AND 2

Continuous melt polymerization was conducted twice each time by feeding, through a metering pump to a twin-screw extruder, a mixture composed of a high polymer diol and a chain extender (low molecular diol) and heated at 80° C. and 4,4-diphenylmethane diisocyanate (MDI) melted by heating at 50° C., to obtain two types of polyurethane. The polyurethanes were each extruded into water to form a strand, and the strands were cut to give two groups of pellets, respectively, which were to be used in Examples 1 and 2.

The two groups of pellets were each dried in vacuo at 80° C. for 20 hours, and then spun through a conventional spinning machine equipped with single-screw extruder at a spinning temperature of 235° C., spinning speed of 650 m/min, apparent draft of 847, spinning tension of 0.1 g/d and speed difference between godet roll and take-up of 25 m/min, to obtain a polyurethan yarn of 80 deniers/2 filaments. The yarns thus obtained were heat treated at 80° C. for 48 hours and then tested for properties. The results were, as shown in Columns 1 and 2 of Table 3, favorable.

EXAMPLES 3 through 5

Three types of polyurethane elastomer with compositions shown in Table 3 were obtained in the same manner as in Example 1. The polyurethanes were dried in vacuo at 80° C. for 20 hours, then fed to a spinning head at 225° C. while a compound obtained by reacting PMAZ (polyester diol of MPD/AZ) having a molecular weight of 1,000 with 2 molar equivalents of MDI was being added in an amount such that the molar ratio of (B)/[(A)+(C)] is 1.07. The mixtures were then extruded through a twin-screw extruder equipped with loss-in-weight feeder. The spinnings were conducted at a spinning speed of 700 m/min, apparent drafts shown in Table 3, spinning tension of 0.1 g/d and a speed difference between godet roll and take-up of 35 m/min to obtain 3 types of elastic polyurethane yarn of 70 deniers/2 filaments. The yarns thus obtained were heat treated at 100° C. for 24 hours and tested for properties, to give favorable results as shown in Table 3.

EXAMPLES 6 THROUGH 9

Polyurethanes with compositions shown in Table 3 were synthesized in the same manner as in Example 1, and, without being pelletized, fed as they were to a spinning head at 240° C. and extruded and spun at a spinning speed of 600 m/min, apparent drafts shown in Table 3, a spinning tension of 0.1 g/d and a speed difference between godet roll and take-up of 30 m/min, to yield polyurethane yarns of 70 deniers/2 filaments. The yarns thus obtained were heat treated at 100° C. for 24 hours and tested for properties, to give favorable results as shown in Table 3.

EXAMPLE 10

A mixture of Polyester b and BD, heated at 30° C. and MDI heated at 50° C. were fed in amounts to make the molar ratio of (MDI/Polyester b+BD)=1 with a metering pump to a continuous polymerization apparatus (twin-screw extruder) to effect polymerization at a polymerization temperature (middle cylinder temperature) of 230° C., followed by extrusion into strand, which was then cut and immediately thereafter dried at 80° C. with a dry air having a dew point of −20° C. to give pellets.

The pellets thus obtained were dried in vacuo at 80° C. for 24 hours, and then spun through a spinning machine comprising a twin-screw extruder equipped with a metering feeder. During spinning, there was a force-added with a gear pump into middle part of the extruder a blended additive comprising, in a ratio of 1:1, polydimethylsiloxane modified with ethylene oxide (200 ct) and a compound obtained by reacting Polyester b with MDI in a molar ratio of 1:17. The polyurethane thus obtained and having a composition shown in Table 3 was spun at a spinning speed of 600 m/min, apparent draft of 847, a spinning tension of 0.09 g/d and a speed difference between the godet roll and take-up of 30 m/min, with a finish of dimethylsilicone being added, to give an elastic polyurethane yarn of 70 deniers/2 filaments.

The yarn thus obtained was heat treated at 80° C. for 24 hours. The yarn was evaluated for its characteristics and showed, as shown in Table 3, high heat resistance and elastic recovery, and also was good in unwinding property.

COMPARATIVE EXAMPLES 1 AND 2

Polyurethane yarns were obtained in the same manner as in Example 1 and under conditions shown in Table 3, and heat treated at 80° C. for 48 hours. Evaluation of the yarns for physical properties showed that, as shown in Table 3, they had low elongations, low elastic recoveries and were, in particular, of extremely poor in hot water resistance in terms of strength retention.

COMPARATIVE EXAMPLES 3 THROUGH 5

Three polyurethane yarns were obtained in the same manner as in Example 1 and under conditions shown in Table 3, and heat treated at 80° C. for 48 hours. Evaluation of the yarns for physical properties showed that, as shown in Table 3, although they had high resistance to hot water in terms of strength retention, they had low elongations and low elastic recoveries.

COMPARATIVE EXAMPLES 6 AND 7

Polyurethane yarns were obtained in the same manner as in Example 1 and under conditions shown in Table 3. The spinnability was poor, yarn breakage occurring sometimes, for both cases. The obtained yarns showed, upon evaluation, low elongations as shown in Table 3.

COMPARATIVE EXAMPLE 8

A polyurethane having a composition shown in Table 3 was obtained and pelletized in the same manner as in Example 1. The pellets were spun in the same manner as in Example 1 except for employing an apparent draft of 30 to give a polyurethane yarn of 80 deniers/2 filaments. The yarn was heat treated at 80° C. for 48 hours and evaluated for physical properties. The results revealed that, as shown in Table 3, the yarn was of low elongation.

Obviously, numerous modifications and variations of the present invention are possible in light of the above teachings. It is therefore to be understood that within the scope of the appended claims, the invention may be practiced otherwise than as specifically described herein.

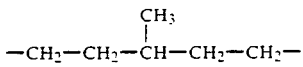

and n represents an integer of 4 to 10, and satisfying the following relationships (1) and (2)

$$6 \leq \frac{\text{(total number of carbon atoms/number of ester bonds)}}{} \leq 9 \quad (1)$$

$$0.03 \leq \frac{\text{(number of methyl groups/total number of carbon atoms)}}{} \leq 0.1 \quad (2)$$

wherein the total number of carbon atoms is the number of carbon atoms in the high polymer diol excluding those contained in the ester bonds; the molar ratio of (B)/(A) being 1.5 to 4.5; said fiber satisfying the conditions (I), (II) and (III) given below, $$\text{Hot water resistance in terms of strength retention } (\%) \geq 60 \quad (I)$$

TABLE 3

| | High polymer diol (A) (moles) | Organic diisocyanate (B) (moles) | Chain extender (C) (moles) | B / (A + C) (molar ratio) | Apparent draft ratio | Properties of elastic polyurethane fiber | | | |
|---|---|---|---|---|---|---|---|---|---|
| | | | | | | Strength (g/d) | Elongation (%) | Hot water resistance; retention of strength (%) | Instantaneous recovery ratio |
| Example 1 | polyester a(1.0) | MDI (3.55) | BD(2.38) | 1.05 | 847 | 1.3 | 520 | 85 | 0.95 |
| Example 2 | b(1.0) | MDI (2.80) | BD/BHEB(0.8/0.8) | 1.06 | 847 | 1.2 | 550 | 86 | 0.97 |
| Example 3 | c(1.0) | MDI (3.30) | BD(2.3) | 1.07 | 542 | 1.3 | 530 | 86 | 0.96 |
| Example 4 | d(1.0) | MDI (2.80) | BD(1.8) | 1.07 | 415 | 1.3 | 510 | 90 | 0.94 |
| Example 5 | e(1.0) | MDI (3.35) | BD(2.3) | 1.07 | 847 | 1.5 | 530 | 85 | 0.97 |
| Example 6 | f(1.0) | MDI (3.25) | BD(2.1) | 1.05 | 542 | 1.2 | 510 | 84 | 0.96 |
| Example 7 | g(1.0) | MDI (3.25) | BD(2.1) | 1.05 | 542 | 1.4 | 510 | 87 | 0.97 |
| Example 8 | h(1.0) | MDI (3.25) | BD(2.1) | 1.05 | 305 | 1.3 | 500 | 86 | 0.96 |
| Example 9 | e(1.0) | MDI (2.55) | BHEB(1.43) | 1.05 | 211 | 1.4 | 490 | 89 | 0.97 |
| Example 10 | b(1.0) | MDI (3.0) | BD(2.0) | 1.00* (1.05) | 847 | 1.4 | 535 | 88 | 0.97 |
| Comparative Example 1 | i(1.0) | MDI (3.15) | BD(2.0) | 1.05 | 211 | 1.5 | 400 | 39 | 0.25 |
| Comparative Example 2 | j(1.0) | MDI (3.15) | BD(2.3) | 1.05 | 847 | 1.3 | 480 | 59 | 0.90 |
| Comparative Example 3 | k(1.0) | MDI (3.15) | BD(2.0) | 1.05 | 542 | 1.4 | 250 | 89 | 0.17 |
| Comparative Example 4 | l(1.0) | MDI (3.15) | BD(2.0) | 1.05 | 847 | 1.1 | 350 | 87 | 0.70 |
| Comparative Example 5 | m(1.0) | MDI (3.15) | BD(2.0) | 1.05 | 847 | 0.9 | 400 | 75 | 0.75 |
| Comparative Example 6 | n(1.0) | MDI (4.5) | BD(3.23) | 1.06 | 847 | 1.1 | 360 | 85 | 0.95 |
| Comparative Example 7 | a(1.0) | MDI (5.0) | BD(3.8) | 1.04 | 847 | 1.5 | 300 | 86 | 0.90 |
| Comparative Example 8 | a(1.0) | MDI (3.0) | BD(2.0) | 1.00 | 30 | 1.1 | 290 | 82 | 0.90 |

The hot water resistances are expressed in terms of retention of strength measured on samples treated with hot water at 130° C.
*The value in parenthesis is the molar ratio after polyisocyanate compound has been added during spinning.

What is claimed is:

1. A polyurethane fiber prepared from a polyurethane obtained by copolymerizing a high polymer diol (A), an organic diisocyanate (B) and a chain extender (C), the high polymer diol (A) of the polyurethane being a polyester diol having a number average molecular weight of 1,000 to 3,500, comprising repeating units represented by the general formula

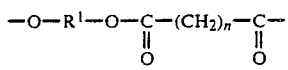

wherein $R^1$ represents a divalent organic group(s) at least 50% by mole of which is $$\text{Ratio of instantaneous elastic recoveries} \geq 0.8 \quad (II)$$

which is a ratio of instantaneous elastic recovery when elongated to 200% at $-10°$ C. to that at 20° C.

$$\text{Elongation } (\%) \geq 350 \quad (III)$$

2. An elastic polyurethane fiber according to claim 1, wherein said polyurethane had an allophanate bond of 0.005 to 0.05 mmol/g.

3. An elastic polyurethane fiber according to claim 1, wherein said polyurethane had an inherent viscosity of 0.2 to 1.6 dl/g.

4. An elastic polyurethane fiber according to claim 1, wherein $R^1$ of said general formula

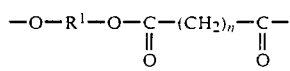

is

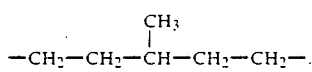

5. An elastic polyurethane fiber according to claim 1, wherein n of said general formula

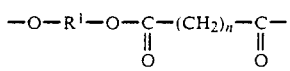

is an integer of 7 to 10.

6. An elastic polyurethane fiber according to claim 1, wherein said polyurethane is essentially composed of repeating units of:
(a) divalent group derived from the high polymer diol with its terminal hydroxyl groups ends being removed of 2 hydrogen atom;
(b) a group derived from an organic diisocyanate of the formula

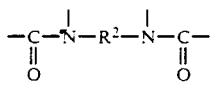

wherein $R^2$ represents a divalent organic group; and
(c) a group from a chain extender with its two hydrogen atoms reactable with an isocyanate being removed: in a molar ratio of (b)/[(a)+(c)] of 0.9 to 1.2.

7. An elastic polyurethane fiber according to claim 6, wherein said molar ratio (b)/[(a)+(c)] is 1.02 to 1.15.

8. An elastic polyurethane fiber according to claim 6, wherein said group (b) derived from an organic diisocyanate is 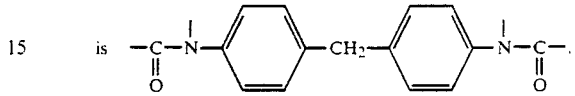.

9. An elastic polyurethane fiber according to claim 6, wherein said group (c) from a chain extender with its two hydrogen atoms reactable with an isocyanate being removed is either —O—$CH_2$—$CH_2$—CH—$CH_2$—O— or

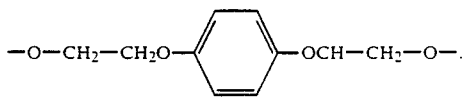.

10. An elastic polyurethane fiber according to claim 1, further comprising an organic polysiloxane.

* * * * *